US009876999B2

(12) United States Patent
 Katou et al.

(10) Patent No.: US 9,876,999 B2
(45) Date of Patent: Jan. 23, 2018

(54) OPTICAL MODULE AND PROJECTION IMAGE DISPLAY DEVICE

(71) Applicant: Hitachi-LG Data Storage, Inc., Tokyo (JP)

(72) Inventors: Seiichi Katou, Tokyo (JP); Hiroshi Ogasawara, Tokyo (JP); Fumihito Ichikawa, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 393 days.

(21) Appl. No.: 14/750,316

(22) Filed: Jun. 25, 2015

(65) Prior Publication Data
 US 2016/0021349 A1   Jan. 21, 2016

(30) Foreign Application Priority Data
 Jul. 16, 2014   (JP) .................................. 2014-145522

(51) Int. Cl.
 *F21V 19/00*  (2006.01)
 *G03B 21/20*  (2006.01)
 (Continued)

(52) U.S. Cl.
 CPC ......... *H04N 9/3144* (2013.01); *F21V 19/003* (2013.01); *F21V 19/0035* (2013.01);
 (Continued)

(58) Field of Classification Search
 CPC ...... F21V 19/00; F21V 19/001; F21V 19/003; F21V 19/0035; F21V 29/71;
 (Continued)

(56) References Cited

U.S. PATENT DOCUMENTS

| 7,513,661 B2 | 4/2009 | Hamada et al. |
| 2012/0170261 A1* | 7/2012 | Hu ...................... H01R 12/7076 362/217.16 |
| 2016/0084483 A1* | 3/2016 | Dubuc .................. F21V 23/023 362/373 |

FOREIGN PATENT DOCUMENTS

| EP | 2 071 399 A1 | 6/2009 |
| EP | 2 211 094 A1 | 7/2010 |

(Continued)

OTHER PUBLICATIONS

Extended European Search Report received in corresponding European Application No. 15173931.5 dated Dec. 16, 2015.

*Primary Examiner* — William C Dowling
(74) *Attorney, Agent, or Firm* — Mattingly & Malur, PC

(57) ABSTRACT

An optical module has light source mounting parts that include a reinforcement plate for a circuit board on which a light source is mounted, and is attached to a lateral surface of a housing. The optical module includes a protrusion and a thermally conductive member. The protrusion is formed on the outer circumference of the lateral surface of the housing. The thermally conductive member includes a first surface and a second surface. The first surface is thermally conductively connected to a surface of the reinforcement plate. The second surface is thermally conductively connected to the protrusion. The thermally conductive member has an inclined surface on the back side of the first surface. The inclined surface is formed along the first surface in such a manner that the thickness between the first surface and the inclined surface increases with a decrease in the distance to the second surface.

10 Claims, 7 Drawing Sheets

(51) Int. Cl.
*F21K 2/00* (2006.01)
*H04N 9/31* (2006.01)
*G02B 27/01* (2006.01)
*G03B 21/16* (2006.01)
*F21V 29/71* (2015.01)

(52) U.S. Cl.
CPC .......... *F21V 29/71* (2015.01); *G02B 27/0101* (2013.01); *G03B 21/16* (2013.01); *H04N 9/312* (2013.01); *H04N 9/3164* (2013.01); *H04N 9/3179* (2013.01); *G02B 2027/014* (2013.01); *G03B 21/2013* (2013.01)

(58) Field of Classification Search
CPC .. G02B 27/0101; H04N 9/312; H04N 9/3164; H04N 9/317
See application file for complete search history.

(56) References Cited

FOREIGN PATENT DOCUMENTS

| | | |
|---|---|---|
| EP | 2 226 842 A1 | 9/2010 |
| EP | 2 357 402 A2 | 8/2011 |
| EP | 2 530 521 A1 | 12/2012 |
| EP | 2 626 919 A1 | 8/2013 |
| JP | 2008-47383 A | 2/2008 |
| JP | 2010-140912 A | 6/2010 |
| JP | 2010-177076 A | 8/2010 |
| WO | 2014/024771 A1 | 2/2014 |
| WO | 2014/034551 A1 | 3/2014 |

* cited by examiner

IMAGE INPUT SIGNAL

OPTICAL MODULE AND PROJECTION IMAGE DISPLAY DEVICE

CLAIM OF PRIORITY

The present application claims priority from Japanese Patent application serial No. 2014-145522, filed on Jul. 16, 2014, the content of which is hereby incorporated by reference into this application.

FIELD OF THE INVENTION

The present invention relates to an optical module and a projection image display device. More specifically, the present invention relates, for example, to a projection image display device that uses a plurality of light-emitting diodes or other light-emitting elements.

BACKGROUND OF THE INVENTION

In recent years, an easily portable, small-size projector capable of displaying a large-size image is vigorously developed. For example, a video camera incorporating a small-size projector connectable, for instance, to a notebook computer or a projector capable of projecting a recorded image is now commercially available. It seems that a projector will be incorporated into mobile phones and smartphones in the future.

A projection image display device is known as a projector that uses a light-emitting diode as a light source instead of a conventional lamp-type light source. It is expected that such a projection image display device will be deployed as a head-up display. The head-up display is mounted, for instance, in an automobile due to its high-luminance image display capability to project an image onto a windshield for navigation or other purposes. Light-emitting diodes have advantages over lamps of being longer life and consuming less power. Meanwhile, the light-emitting diodes, particularly red ones, significantly decrease its light intensity when a temperature rise occurs.

The projection image display device produces an image by mixing red, green, and blue light. If the intensity of red light lowers due to a temperature rise in a red light source during the use of the projection image display device, the intensities of green light and blue light have to be lowered in accordance with the intensity of red light. This causes a problem in which a bright image cannot be maintained for a long period of time. In order to maintain a bright image in the above circumstances, it is important that the temperature rise in the red light source be reduced to suppress a decrease in light intensity.

A method of dissipating heat through a heat sink is disclosed in Japanese Unexamined Patent Application Publication No. 2010-177076 in order to address the above problem. The disclosed method transfers heat generated from a light-emitting diode (LED) circuit board to a frame through a heat sink for the purpose of preventing an LED temperature rise.

SUMMARY OF THE INVENTION

A head-up display or other optical module mounted in an automobile or the like and operated at a high temperature needs to exhibit improved heat dissipation performance.

However, the structure described in Japanese Unexamined Patent Application Publication No. 2010-177076 has to be unduly large in size in order to simply provide improved heat dissipation performance.

The present invention has been made in view of the above circumstances and provides an optical module and a projection image display device that have a simple structure to improve the heat dissipation performance of a light source without increasing the size of hardware.

In order to solve the above problem, according to an aspect of the present invention, there is provided an optical module having a plurality of light source mounting parts. The light source mounting parts each include a light source, a circuit board on which the light source is mounted, and a reinforcement plate attached to the circuit board to reinforce the circuit board. The light source mounting parts are attached to a lateral surface of a housing containing optical parts. The optical module combines light from a plurality of light sources and irradiates a desired region with the combined light. The optical module includes a protrusion and a thermally conductive member. The protrusion is formed on the outer circumference of the lateral surface of the housing to which the light source mounting parts are attached. The thermally conductive member includes a first surface and a second surface. The first surface is thermally conductively connected to a surface different from a surface of the reinforcement plate that is attached to the circuit board. The second surface is thermally conductively connected to the protrusion. The thermally conductive member has an inclined surface on the back side of the first surface. The inclined surface is formed along the first surface in such a manner that the thickness between the first surface and the inclined surface increases with a decrease in the distance to the second surface.

According to another aspect of the present invention, there is provided a projection image display device having an optical module, a video signal processing circuit, a light source drive circuit, and a modulation element drive circuit. The optical module includes a plurality of light source mounting parts. The light source mounting parts each include a light source, a circuit board on which the light source is mounted, and a reinforcement plate attached to the circuit board to reinforce the circuit board. The light source mounting parts are attached to a lateral surface of a housing containing optical parts. The optical module combines light from a plurality of light sources and irradiates a desired region with the combined light. The video signal processing circuit generates an image signal from an image signal input from the outside. The light source drive circuit supplies a drive current to the light sources. The modulation element drive circuit controls a modulation element. The projection image display device includes a protrusion and a thermally conductive member. The protrusion is formed on the outer circumference of the lateral surface of the housing to which the light source mounting parts are attached. The thermally conductive member includes a first surface and a second surface. The first surface is thermally conductively connected to a surface different from a surface of the reinforcement plate that is attached to the circuit board. The second surface is thermally conductively connected to the protrusion. The thermally conductive member has an inclined surface on the back side of the first surface. The inclined surface is formed along the first surface in such a manner that the thickness between the first surface and the inclined surface increases with a decrease in the distance to the second surface.

According to an aspect of the present invention, a temperature rise in a red light source can be efficiently reduced without enlarging the size of hardware. Thus, a decrease in the light intensity of the red light source can be suppressed. This makes it possible to provide an optical module and a projection image display device that are capable of maintaining a bright image for a long period of time. Further, it is possible to provide an optical module and a projection image display device that are capable of showing a bright image at low power consumption.

The other problems, configurations, and advantageous effects will become apparent from the following description of embodiments.

DETAILED DESCRIPTION OF THE INVENTION

Figure 1:
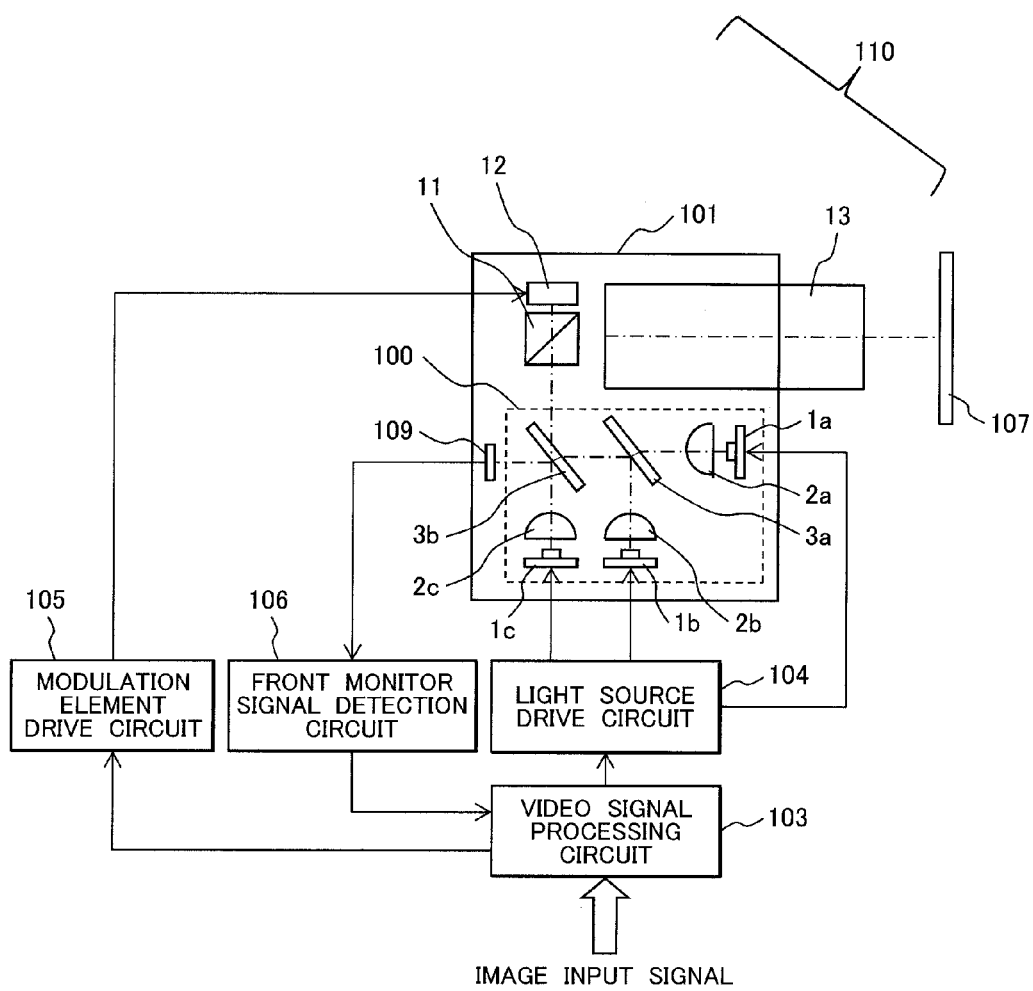
FIG. 1 is a diagram illustrating an overall configuration of a projection image display device according to a first embodiment of the present invention.

Embodiments of the present invention will now be described with reference to the accompanying drawings. Elements designated by the same reference numeral have the same function. Therefore, they may not be redundantly described.

Orthogonal coordinate axes, namely, the x-, y-, and z-axes, are depicted as needed in the drawings in order to clearly explain about the positions of individual sections.

First Embodiment

An optical module 101 and a projection image display device 110 that uses the optical module 101 will be described in conjunction with a first embodiment of the present invention. The optical module 101 and the projection image display device 110 are implemented to reduce a temperature rise in a red light source and maintain a bright image for a long period of time without enlarging the size of hardware and increasing the power consumption.

Figure 2:
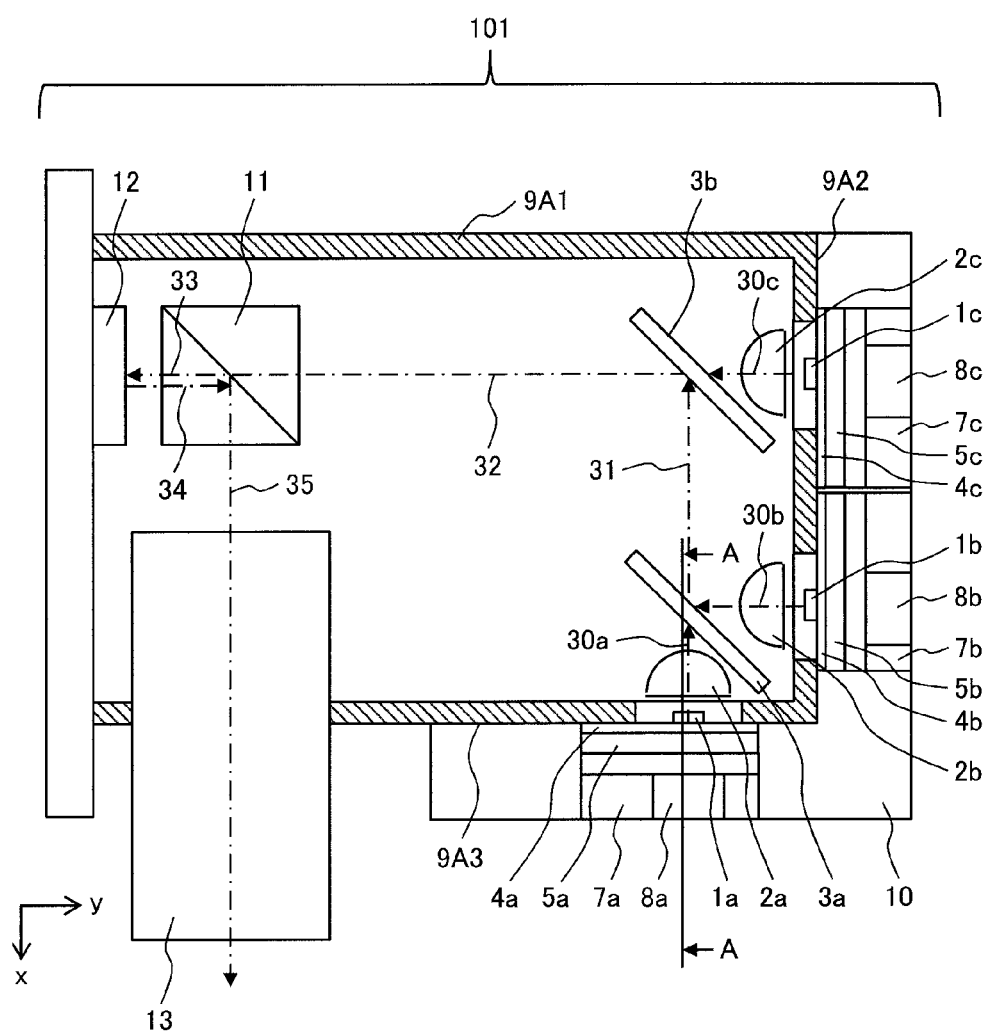
FIG. 2 is a diagram illustrating a configuration of an optical module according to the first embodiment.
Figure 3:
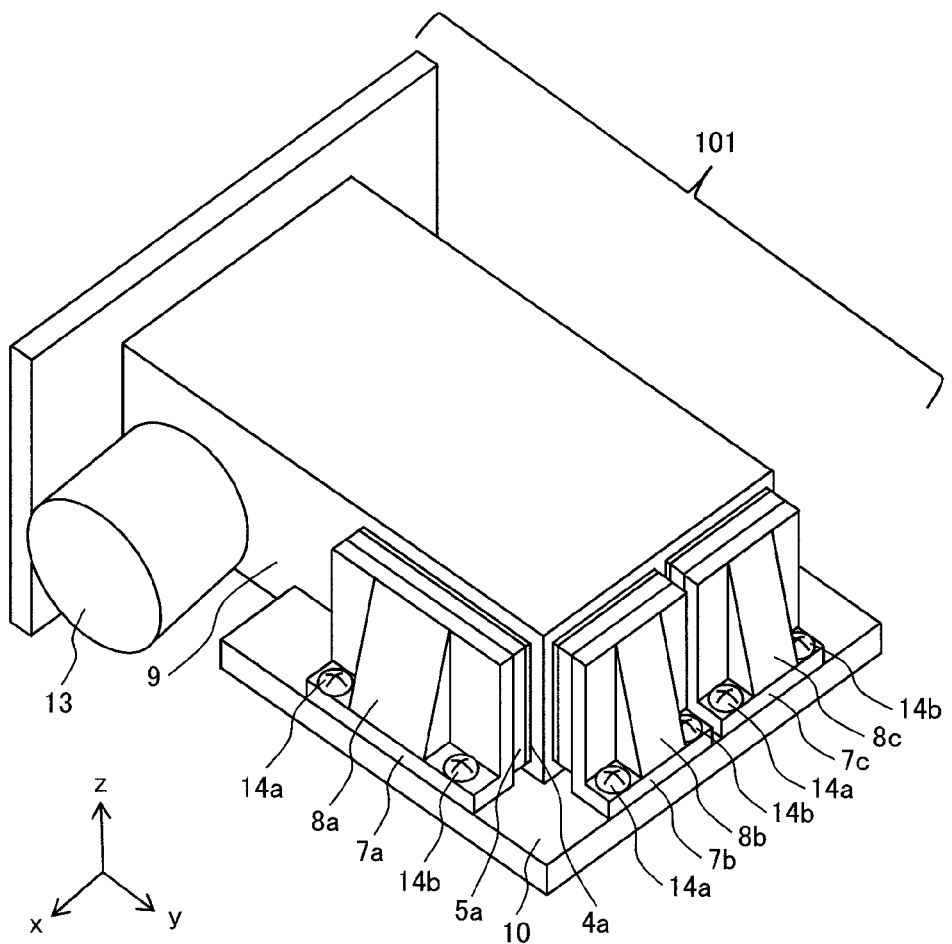
FIG. 3 is an external perspective view of the optical module according to the first embodiment.
Figure 4:
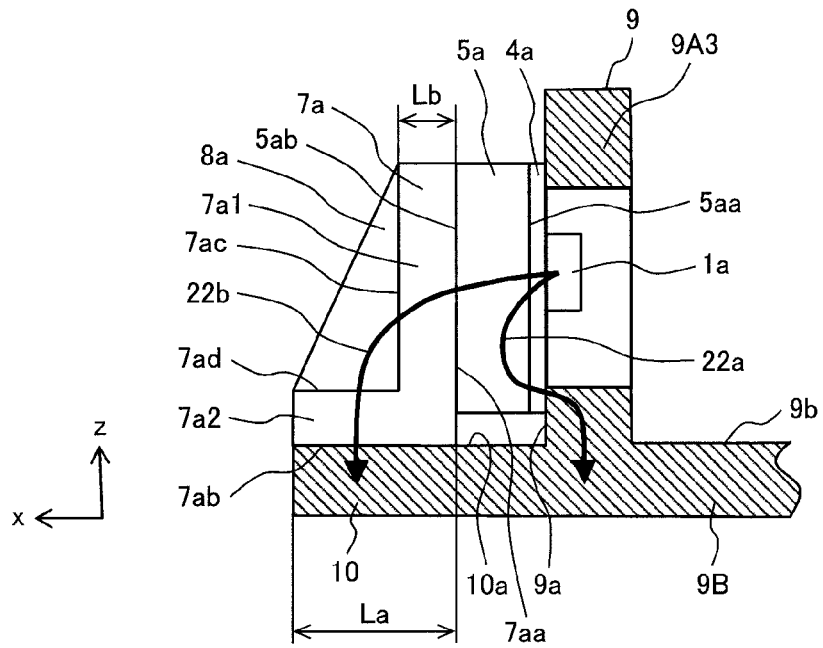
FIG. 4 is a cross-sectional view of the optical module according to the first embodiment as taken along line A-A of FIG. 2.
Figure 8:
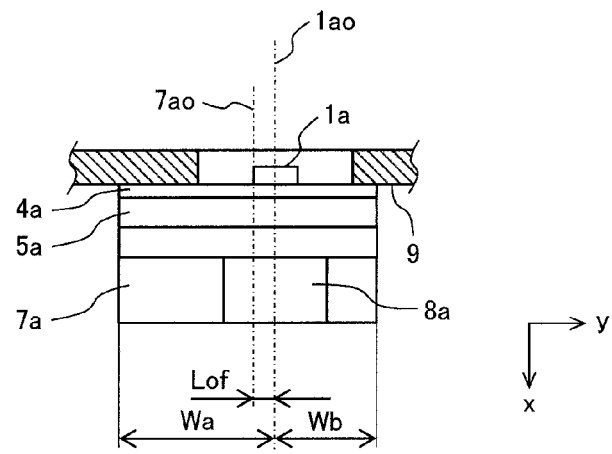
FIG. 8 is an enlarged view illustrating a configuration of the vicinity of a first light source of the optical module according to the first embodiment.
Figure 9:
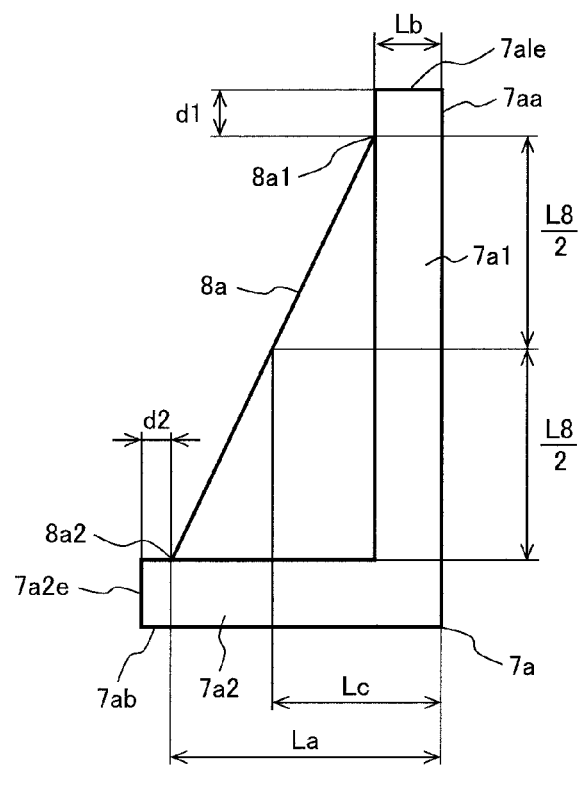
FIG. 9 is a diagram illustrating a configuration of the thermally conductive member according to the first embodiment.

The first embodiment will be described below with reference to FIGS. 1 to 4, 8, and 9. FIG. 1 is a diagram illustrating an overall configuration of the projection image display device according to the present embodiment. FIG. 2 is a diagram illustrating a configuration of the optical module 101 according to the present embodiment. FIG. 3 is a schematic perspective view illustrating a configuration of the optical module 101 according to the present embodiment. FIG. 4 is a cross-sectional view taken along line A-A of FIG. 2. FIG. 8 is an enlarged view illustrating a configuration of the vicinity of a first light source 1a of the optical module according to the present embodiment. FIG. 9 is a diagram illustrating a configuration of a thermally conductive member according to the present embodiment.

Elements designated by the same reference numerals in FIGS. 1 to 4, 8, and 9 have the same function.

As shown in FIG. 1, the projection image display device 110 includes the optical module 101, a video signal processing circuit 103, a light source drive circuit 104, a front monitor signal detection circuit 106, and a modulation element drive circuit 105. The projection image display device 110 drives a modulation element 12 related to an image input signal and projects image light onto a screen 107 through a projection optical system 13. The front monitor signal detection circuit 106 inputs a signal from a front monitor 109 and detects the level of output from a light source. The detected output level is input to the video signal processing circuit 103 in which the output of the light source is controlled to obtain a predetermined output.

The optical module 101 includes an illumination optical system 100, the modulation element 12, and the projection optical system 13, which are housed in a single retainer housing 9. In other words, the illumination optical system 100, the modulation element 12, and the projection optical system 13, and other optical parts are contained in the retainer housing 9 so that the optical module 101 combines light from a plurality of light sources and irradiates a desired region with the combined light.

The illumination optical system 100 combines a plurality of light paths differing in wavelength and forms an image on the modulation element 12. The illumination optical system 100 is configured so that the first light source 1a, a second light source 1b, a third light source 1c, a first collimator lens 2a, a second collimator lens 2b, a third collimator lens 2c, a first dichroic mirror 3a, a second dichroic mirror 3b, and a prism 11 are sequentially disposed from the light source side in the order named.

A light-emitting diode that emits red light is encapsulated in the first light source 1a so that the first light source 1a emits red light. A light-emitting diode that emits blue light is encapsulated in the second light source 1b so that the second light source 1b emits blue light. A light-emitting diode that emits green light is encapsulated in the third light source 1c so that the third light source 1c emits green light. The first collimator lens 2a functions so that red light emitted from the first light source 1a is converted to parallel light. The second collimator lens 2b functions so that blue light emitted from the second light source 1b is converted to parallel light. The third collimator lens 2c functions so that green light emitted from the third light source 1c is converted to parallel light. The first collimator lens 2a, the second collimator lens 2b, and the third collimator lens 2c may be formed of a single lens or of a plurality of lenses. The first dichroic mirror 3a produces a two-color light path 31 by allowing red light 30a incident from the first light source 1a to be transmitted toward a mirror surface and by causing blue light 30b incident from the second light source 1b to be reflected from the mirror surface. Similarly, the second dichroic mirror 3b produces a three-color light path 32 by allowing green light 30c incident from the third light source 1c to be transmitted toward a mirror surface and by causing red light 30a incident from the first light source 1a and blue light 30b incident from the second light source 1b to be reflected from the mirror surface.

The prism 11 functions so that light 30a, light 30b, and light 30c, which are incident respectively from the first light source 1a, the second light source 1b, and the third light source 1c, are transmitted as indicated at 33, and that the light 30a, light 30b, and light 30c, which are reflected by the modulation element 12 and incident again as indicated at 34, are reflected toward the projection optical system 13 as indicated at 35.

The modulation element 12 generates image light by modulating the light emitted from the first light source 1a, the second light source 1b, and the third light source 1c. The projection optical system 13 enlarges the image light and projects the enlarged image light onto the screen 107 through a projection opening formed in the housing 9.

The first light source 1a, the second light source 1b, and the third light source 1c are positioned so that the red light-emitting diode, which significantly decreases its light intensity in the event of a temperature rise, is disposed apart from the red light-emitting diode, which generates an increased amount of heat in the event of a temperature rise. Further, in order to help the red light-emitting diode deliver its heat dissipation performance with ease, the red light-emitting diode is disposed on a surface of the housing 9 that is different from the housing surface on which the green and blue light-emitting diodes are mounted. In other words, when the first light source 1a having the red light-emitting diode and the third light source 1c having the green light-emitting diode are disposed as shown in FIG. 2, the heat dissipation performance of the red light-emitting diode can be improved with ease.

The layout of the red, green, and blue light-emitting diodes will now be described in detail. In the present embodiment, lateral surfaces 9A1, 9A2 of the housing 9 are perpendicular to each other, and lateral surfaces 9A2, 9A3 of the housing 9 are perpendicular to each other. Thus, the cross-section of the housing 9 shown in FIG. 2 is rectangular. The cross-section shown in FIG. 2 is parallel to light paths 31, 32, 33, 34, 35. The first light source 1a formed of the red light-emitting diode is disposed on the lateral surface 9A3, and the second light source 1b formed of the blue light-emitting diode and the third light source 1c formed of the green light-emitting diode are disposed on the lateral surface 9A2. On the lateral surface 9A2, the second light source 1b formed of the blue light-emitting diode is disposed toward the first light source 1a formed of the red light-emitting diode. The third light source 1c formed of the green light-emitting diode is disposed at a distance from the first light source 1a formed of the red light-emitting diode with the second light source 1b formed of the blue light-emitting diode interposed therebetween.

The configuration of the vicinity of each of the light sources 1a, 1b, 1c will now be described with reference to FIGS. 2 and 4. As the light sources 1a, 1b, 1c are similar to each other in configuration, the vicinity of the first light source 1a is described below. The difference between the configurations of the light sources 1a, 1b, 1c will be described as needed.

The first light source 1a is mounted on a first circuit board 4a and attached to the lateral surface 9A3 of the housing 9 in such a manner as to form a light path with the second light source 1b and the third light source 1c. The first circuit board 4a is formed, for instance, of a flexible substrate and attached to a first reinforcement plate 5a to ensure its rigidity. The first reinforcement plate 5a is formed, for instance, of aluminum, which is highly thermally conductive, in order to form a thermal path 22a. The thermal path 22a is such that the heat of the first light source 1a is conducted to the first reinforcement plate 5a through the first circuit board 4a, spread by the first reinforcement plate 5a, and conducted to the lateral surface 9A3 of the housing 9 through the first circuit board 4a again. In the common optical module 101, a thermal path is used to ensure adequate heat dissipation performance of the first light source 1a. However, a head-up display mounted, for instance, in the automobile or other optical module 101 operated at a high temperature needs to exhibit improved heat dissipation performance. Therefore, an L-shaped thermally conductive member 7a is disposed in contact with a surface 5ab of the first reinforcement plate 5a and with an extended portion 10. The surface 5ab is different from a surface 5aa of the first reinforcement plate 5a to which the first circuit board 4a is attached. The extended portion 10 is extended to the outside of the housing 9 from a bottom portion 9B that forms a surface 9b substantially perpendicular to a surface 9a of the housing 9 on which the first circuit board 4a is mounted.

In the present embodiment, first light source mounting parts include the first light source 1a, the first circuit board 4a, and the first reinforcement plate 5a. Further, second light source mounting parts include the second light source 1b, the second circuit board 4b, and the second reinforcement plate 5b. Furthermore, third light source mounting parts include the third light source 1c, the third circuit board 4c, and the third reinforcement plate 5c.

The extended portion 10 forms a flange around the lateral surfaces 9A2, 9A3 of the housing 9. The flange 10 is a protrusion that is formed on the outer circumference of the lateral surfaces 9A2, 9A3 of the housing 9 on which the light source mounting parts are mounted. The thermally conductive member 7a has a first side 7a1 and a second side 7a2. The first side 7a1 is positioned substantially perpendicular to the second side 7a2 so that the thermally conductive member 7a is shaped like the letter L. In other words, the first side 7a1 and the second side 7a2 form a bent shape.

On a protruding side (outer side) of the bent shape, a first surface 7aa formed on the first side 7a1 is in contact with and thermally conductively connected to the surface 5ab of the first reinforcement plate 5a. Further, on the protruding side (outer side) of the bent shape, a second surface 7ab formed on the second side 7a2 is in contact with and thermally conductively connected to a surface 10a of the extended portion 10. In other words, the first surface 7aa is thermally conductively connected to the surface 5ab, which is different from the surface 5aa of the reinforcement plate 5a on which is circuit board 4a is mounted, and the second surface 7ab is thermally conductively connected to the protrusion 10.

In the present embodiment, a second thermal path 22b is formed through the contact between the first surface 7aa of the first side 7a1 and the surface 5ab of the first reinforcement plate 5a and through the contact between the second surface 7ab of the second side 7a2 and the surface 10a of the extended portion 10.

The second thermal path 22b based on the thermally conductive member 7a is formed so that the heat of the first light source 1a is conducted to the reinforcement plate 5a through the first circuit board 4a, spread by the reinforcement plate 5a, and conducted through the thermally conductive member 7a to the extended portion 10, which is extended from the bottom portion 9B of the housing 9. In order to further improve the heat dissipation performance of the second thermal path 22b, a block having an inclined surface 8a is attached to the first thermally conductive member 7a. The block having the inclined surface 8a joins the surface 7aa of the first thermally conductive member 7a, which is positioned toward the first reinforcement plate 5a, to the surface 7ab of the first thermally conductive member 7a, which is positioned toward the extended portion 10.

In other words, the inclined surface 8a is formed toward back surfaces 7ac, 7ad of the first surface 7aa and second surface 7ab. Due to the inclined surface 8a, the thermally conductive member 7a is formed along the first surface 7aa in such a manner that the thickness between the first surface 7aa and the inclined surface 8a gradually increases with a decrease in the distance to the second surface 7ab. As described above, the inclined surface 8a is formed on the recessed side (inner side) of the bent shape that is formed by the first side 7a1 and the second side 7a2.

The inclined surface 8a reduces the thermal resistance of the first thermally conductive member 7a, thereby improving the heat dissipation performance of the first light source 1a. In this respect, a portion outside of the inclined surface 8a, which makes a heat transfer path longer than the distance between the surface 7aa of the first thermally conductive member 7a that is positioned toward the first reinforcement plate 5a and the surface 7ab of the first thermally conductive member 7a that is positioned toward the extended portion 10, is eliminated because it does not significantly improve the heat dissipation performance. Therefore, the resulting heat dissipation structure is lighter than a heat dissipation structure shaped like a rectangular parallelepiped.

Here, grease, a thermally conductive sheet, or the like may be disposed between the first circuit board 4a and the housing 9, between the first reinforcement plate 5a and the first thermally conductive member 7a, and between the first thermally conductive member 7a and the extended portion 10 extended from the bottom portion 9B of the housing 9 in order to improve the adhesion between the abovementioned members for the purpose of reducing the thermal resistance and enhancing the heat dissipation performance.

The above-described structure can also be employed for the second light source 1b and for the third light source 1c. More specifically, the second circuit board 4b, the second reinforcement plate 5b, a second thermally conductive member 7b, and a second inclined surface 8b can be provided for the second light source 1b. Further, the third circuit board 4c, the third reinforcement plate 5c, a third thermally conductive member 7c, and a third inclined surface 8c can be provided for the third light source 1c.

The use of the first thermally conductive member 7a having the inclined surface 8a improves the heat dissipation performance by efficiently facilitating heat conduction from the first light source 1a. Thus, a small-size, lightweight heat dissipation structure can be implemented. As a result, a temperature rise in the red light source can be reduced to implement the optical module 101 and the projection image display device 110 that are capable of providing a bright image. The foregoing description deals with the red light source. However, when the same heat dissipation structure is employed for the green light source and the blue light source in order to reduce a temperature rise in the light source of each color, the amount of electric power applied to the light sources can be decreased. As a result, the optical module 101 and the projection image display device 110 are capable of providing a bright image at low power consumption.

The first thermally conductive member 7a will now be described in detail with reference to FIG. 3. The adhesion between the first thermally conductive member 7a, the second reinforcement plate 5a, and the extended portion 10 extended from the bottom surface of the housing 9 may be improved, as shown in FIG. 3, by providing both sides of the inclined surface 8a of the first thermally conductive member 7a with portions into which a first mounting member (fastening member) 14a and a second mounting member (fastening member) 14b, such as screws, are to be driven. This will reduce the thermal resistance and improve the heat dissipation performance.

To reduce the size of the optical module 101, it is necessary that the first light source 1a and the second light source 1b be positioned close to each other. However, positioning the light sources close to each other reduces the area of the contact between the first circuit board 4a and the housing 9 and the area of the contact between the second circuit board 4b and the housing 9 as well. The magnitude of the area of the contact between the first circuit board 4a and the housing 9 is related to heat dissipation performance. In order to improve the heat dissipation performance by obtaining an adequate contact area, the first circuit board 4a is extended toward the projection optical system 13, which is disposed opposite the second light source 1b. Consequently, as shown in FIG. 8, the first light source 1a is mounted shifted by Lof toward one side (toward the side opposite the projection optical system 13) from the center 7ao of the first circuit board 4a, the first reinforcement plate 5a, and the first thermally conductive member 7a. In this instance, the inclined surface 8a formed on the first thermally conductive member 7a may be positioned behind the first light source 1a by shifting it also by Lof toward one side (toward the side opposite the projection optical system 13) from the center 7ao of the first circuit board 4a, the first reinforcement plate 5a, and the first thermally conductive member 7a. The inclined surface 8a positioned at a distance from the first light source 1a is reduced in size to decrease the weight. The above-described offset structure of the first light source 1a and of the inclined surface 8a can also be employed for the second light source 1b and the third light source 1c.

The center 7ao of the first circuit board 4a, the first reinforcement plate 5a, and the first thermally conductive member 7a is a center in the y-axis direction, that is, a center in a direction along the line of intersection between the lateral surface 9A3 of the housing 9 and the extended portion 10. The center 1ao in the y-axis direction of the first light source 1a and the inclined surface 8a is positioned at a distance of Wa and of Wb from the left and right ends in the y-axis direction of the first circuit board 4a, the first reinforcement plate 5a, and the first thermally conductive member 7a. The value Wa is greater than the value Wb.

The second light source 1b and the inclined surface 8b are disposed shifted toward the lateral surface 9A3 of the housing 9 from the center of the second circuit board 4b, the second reinforcement plate 5b, and the second thermally conductive member 7b. The third light source 1c and the inclined surface 8c are disposed shifted toward the lateral surface 9A3 of the housing 9 from the center of the third circuit board 4c, the third reinforcement plate 5c, and the third thermally conductive member 7c.

The configuration of the inclined surface 8a will now be described in detail with reference to FIG. 9.

The inclined surface 8a is positioned inside the bent shape of the thermally conductive member 7a, which is formed by the first side 7a1 and the second side 7a2, and formed so as to connect one end 7a1e of the first side 7a1 to one end 7a2e of the second side 7a2. The one end 7a1e of the first side 7a1 and the one end 7a2e of the second side 7a2 are positioned opposite an end (the other end) of the bent side (connection side).

Referring to FIG. 4, one end 8a1 of the inclined surface 8a coincides with the end 7a1e of the first side 7a1, and the other end 8a2 of the inclined surface 8a coincides with the end 7a2e of the second side 7a2. However, as shown in FIG. 9, the end 8a1 of the inclined surface 8a may be shifted by d1 from the end 7a1e of the thermally conductive member 7a. Further, the end 8a2 of the inclined surface 8a may be shifted by d2 from the end 7a2e of the thermally conductive member 7a. Although FIG. 9 indicates that both ends 8a1, 8a2 of the inclined surface 8a are shifted respectively from both ends 7a1e, 7a2e of the thermally conductive member 7a, only one of the ends 8a1, 8a2 of the inclined surface 8a may be shifted from the end 7a1e, 7a2e of the thermally conductive member 7a. In such an instance, the values d1, d2 by which the ends 8a1, 8a2 are shifted from the ends 7a1e, 7a2e are arbitrary and may be determined in consideration of heat dissipation performance.

The block having the inclined surface 8a forms a bulged portion 8a inside the bent shape formed by the first side 7a1 and the second side 7a2. As the bulged portion 8a is formed, the dimension of the thermally conductive member 7a in a direction perpendicular to the lateral surface 9A3 of the housing 9 decreases with an increase in the distance to the extended portion (flange) 10 along the lateral surface 9A3. In other words, as shown in FIG. 4, the first thermally conductive member 7a on which the bulged portion 8a is formed is configured so that the dimension in a direction perpendicular to the lateral surface 9A3 is La on the side toward the extended portion (flange) 10 and Lb on the side toward the end 7a1e of the first side 7a1. The value La is greater than the value Lb. At a midpoint of the range (having a length of L8) over which the bulged portion 8a is disposed, the dimension in a direction perpendicular to the lateral surface 9A3 of the first thermally conductive member 7a is Lc. The value Lc is greater than the value Lb and smaller than the value La. The structure described above may be applied to either or both of the second and third thermally conductive members 7b, 7c.

In the present embodiment, the bulged portion 8a is formed in y-direction over a portion of the thermally conductive member 7a.

The first thermally conductive member 7a includes the inclined surface 8a and portions into which the first mounting member 14a and the second mounting member 14b are to be driven. This establishes a small-size, easy-to-assemble, heat dissipation structure that is capable of improving the heat dissipation performance of the first light source 1a. Further, the use of the inclined surface 8a eliminates a portion that does not significantly improve the heat dissipation performance. Thus, the resulting heat dissipation structure is lighter than a heat dissipation structure shaped like a rectangular parallelepiped.

The above-described structure includes the first thermal path 22a and the second thermal path 22b. The first thermal path 22a is configured so that the heat of the light sources 1a, 1b, 1c, which is initially transferred to the reinforcement plates 5a, 5b, 5c, is subsequently transferred to the surface of the housing 9. The second thermal path 22b is configured so that the heat is transferred to the extended portion (flange) 10 of the housing 9 through the thermally conductive members 7a, 7b, 7c. Thus, it is possible to implement a small-size, lightweight heat dissipation structure capable of efficiently dissipating the heat of the light sources 1a, 1b, 1c. The present embodiment can implement the optical module 101 and the projection image display device 110 that are capable of reducing a temperature rise particularly in the red light source and providing a bright image at low power consumption.

Second Embodiment

Figure 5:
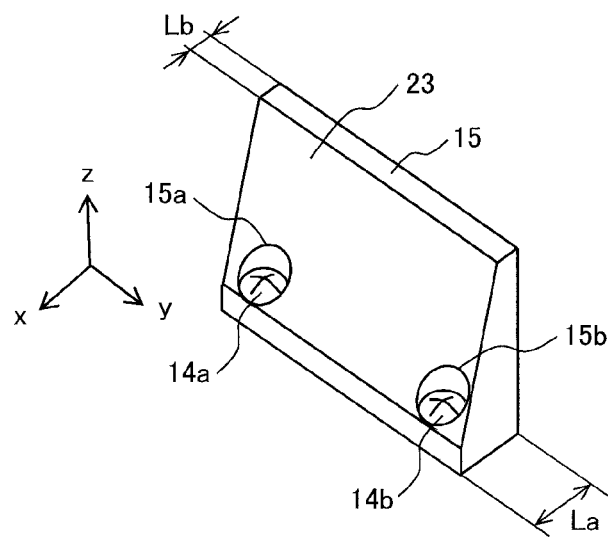
FIG. 5 is a perspective view of a thermally conductive member according to a second embodiment of the present invention.

FIG. 5 is a perspective view of a thermally conductive member 15 according to a second embodiment of the present invention. As shown in FIG. 5, the second embodiment is configured so that an inclined surface 23 of the thermally conductive member 15 is disposed entirely in y-direction. In other words, a bulged portion 23 formed by the inclined surface 23 is disposed in y-direction over the entire thermally conductive member 15. The bulged portion 23 can be configured in the same manner as described in conjunction with the first embodiment except for a y-direction installation range. As the above-described structure is employed, a hole (recessed portion) for mounting the first mounting member 14a and a hole (recessed portion) for mounting the second mounting member 14b may be formed in the inclined surface 23. As far as the inclined surface 23 is large, the heat dissipation performance of the first light source 1a is improved to reduce a temperature rise in the first light source 1a. Consequently, the optical module 101 and the projection image display device 110 are capable of providing a bright image at low power consumption.

The above-described structure can also be employed for the second light source 1b and for the third light source 1c.

Third Embodiment

Figure 6:
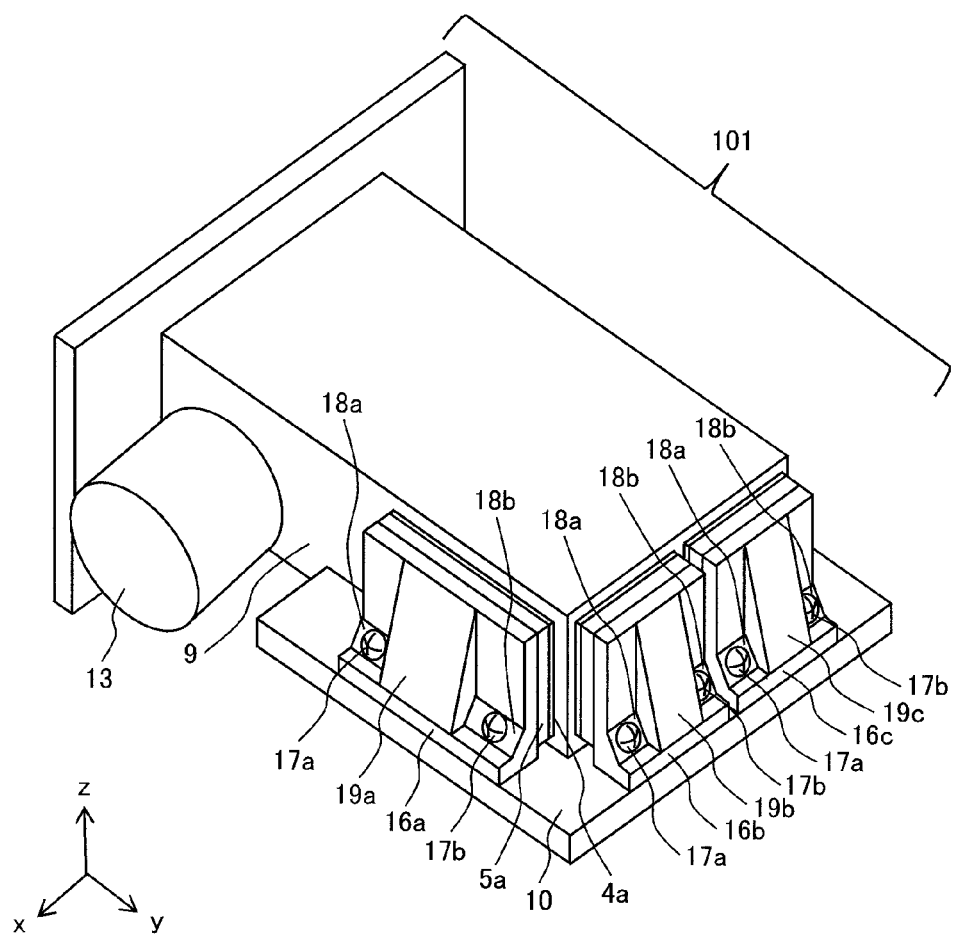
FIG. 6 is a perspective view of the optical module according to a third embodiment of the present invention.

FIG. 6 is a perspective view illustrating the first, second, and third thermally conductive members 16a, 16b, 16c according to a third embodiment of the present invention. The first embodiment is structured so that the first and second mounting members 14a, 14b for the first thermally conductive member 7a are mounted perpendicularly to the extended portion (flange) 10 of the housing 9. The third embodiment, on the other hand, includes a first inclined structure 18a and a second inclined structure 18b, which are used so that the first and second mounting members 14a, 14b for the first thermally conductive member 7a are mounted obliquely to the extended portion (flange) 10 of the housing 9. As first and second mounting members 17a, 17b, such as screws, are mounted obliquely, the tightening force of the screws obliquely presses the thermally conductive member 16a and simultaneously presses the reinforcement plate 5a and the extended portion 10. The members are then closely attached to each other to reduce the thermal resistance. When the thermal resistance is reduced, the heat of the first light source 1a can be efficiently dissipated. This makes it possible to obtain a small-size, lightweight heat dissipation structure. Consequently, the third embodiment can implement the optical module 101 and the projection image display device 110 that are capable of improving the heat dissipation performance of the first light source 1a, reducing a temperature rise in the first light source 1a, and providing a bright image at low power consumption.

The present embodiment is configured so that an inclined surface 19a is formed on the first thermally conductive member 16a, and that an inclined surface 19b is formed on the second thermally conductive member 16b, and further that an inclined surface 19c is formed on the third thermally conductive member 16c. The inclined surfaces 19a, 19b, 19c can be configured in the same manner as the inclined surface 8a in the first embodiment. Alternatively, the inclined surfaces 19a, 19b, 19c may be configured in the same manner as described in conjunction with the second embodiment.

Fourth Embodiment

Figure 7:
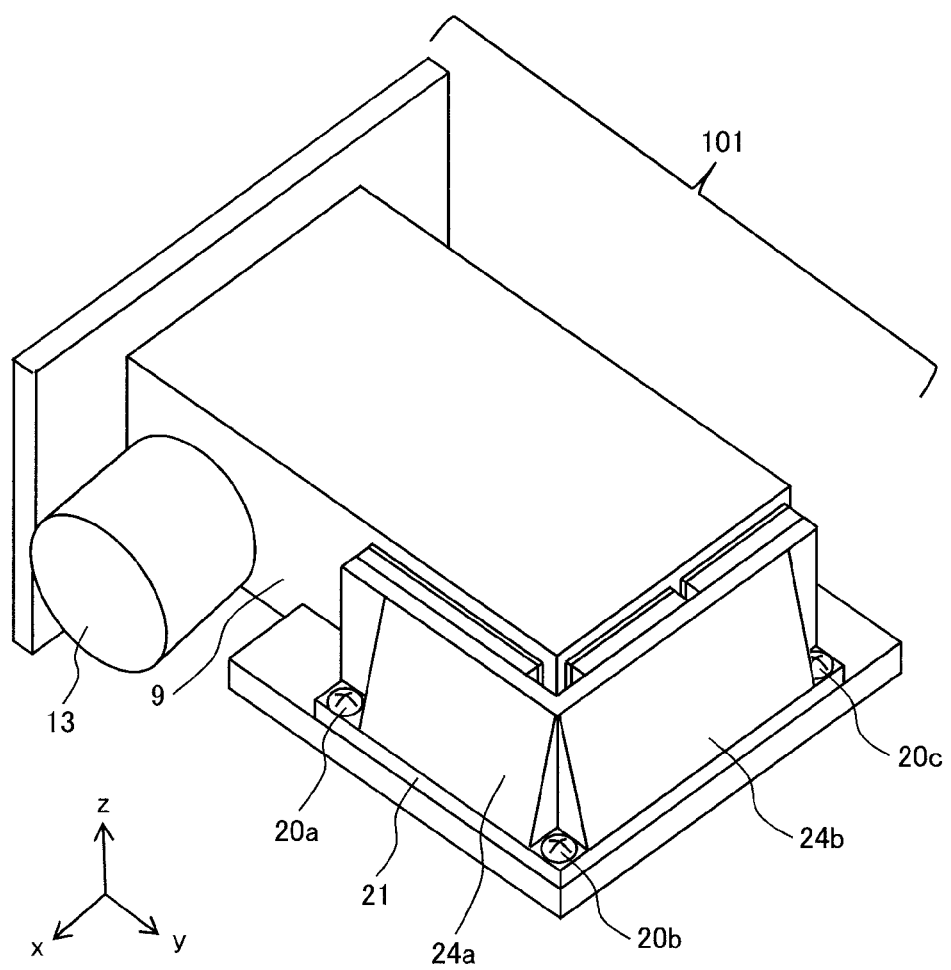
FIG. 7 is a perspective view of the thermally conductive member according to a fourth embodiment of the present invention.

FIG. 7 is a perspective view of a thermally conductive member 21 according to a fourth embodiment of the present invention. The first embodiment uses three thermally conductive members, namely, the first, second, and third thermally conductive members 7a, 7b, 7c. In the fourth embodiment, these three thermally conductive members are integrated into a single thermally conductive member 21. As the only one thermally conductive member 21 is used, the number of employed mounting members is reduced to three so that a first mounting member 20a, a second mounting member 20b, and a third mounting member 20c are used. Thus, the number of parts can be reduced to provide improved assemblability. Consequently, the fourth embodiment can implement the optical module 101 and the projection image display device 110 that are capable of improving the heat dissipation performance of the first light source 1a at low cost, reducing a temperature rise in the first light source 1a, and providing a bright image at low power consumption.

In the present embodiment, two blocks having inclined surfaces (bulged portions) 21a, 21b are provided for the thermally conductive member 21. The bulged portions 21a, 21b may be divided and provided for each of the light sources 1a, 1b, 1c, as is the case with the first embodiment. Further, as is the case with the second embodiment, the bulged portions 21a, 21b may be formed in x- and y-directions to cover the whole range and provided with holes (recessed portions) for mounting the first, second, and third mounting members 20a, 20b, 20c. Furthermore, as is the case with the third embodiment, the first, second, and third mounting members 20a, 20b, 20c may be mounted obliquely to the extended portion (flange) 10 of the housing 9. Moreover, the configurations of the first to third embodiments may be applied to the present embodiment.

The present invention is not limited to the foregoing embodiments, but the foregoing embodiments may be variously modified. The foregoing embodiments have been described in detail, for example, in order to facilitate the understanding of the present invention. The present invention is not limited to embodiments having all the above-described elements. Some elements of a certain embodiment may be replaced by the elements of another embodiment. Further, the elements of a certain embodiment may be added to the elements of another embodiment. Furthermore, some elements of each embodiment may be subjected to the addition of other elements, deleted, or replaced by other elements.

What is claimed is:

1. An optical module having a plurality of light source mounting parts, which each include a light source, a circuit board on which the light source is mounted, and a reinforcement plate attached to the circuit board to reinforce the circuit board, the light source mounting parts being attached to a lateral surface of a housing containing optical parts to let the optical module combine light from a plurality of light sources and irradiate a desired region with the combined light, the optical module comprising:
a protrusion that is formed on the outer circumference of the lateral surface of the housing to which the light source mounting parts are attached; and
a thermally conductive member that includes a first surface and a second surface, the first surface being thermally conductively connected to a surface different from a surface of the reinforcement plate that is attached to the circuit board, the second surface being thermally conductively connected to the protrusion;
wherein the thermally conductive member has an inclined surface on the back side of the first surface, the inclined surface being formed along the first surface in such a manner that the thickness between the first surface and the inclined surface increases with a decrease in the distance to the second surface.

2. The optical module according to claim 1, wherein both sides of the inclined surface formed for the thermally conductive member are provided with a surface for disposing a mounting member.

3. The optical module according to claim 2, wherein the surface for disposing the mounting member on both sides of the inclined surface formed for the thermally conductive member is inclined with respect to the protrusion.

4. The optical module according to claim 1, wherein the inclined surface formed for the thermally conductive member is disposed at the center of the light sources and shifted from the center of the thermally conductive member.

5. The optical module according to claim 1, wherein the light sources are distributively disposed on two lateral surfaces of the housing that are perpendicular to each other; and
wherein the thermally conductive member has an L-shaped structure and can be disposed for all the light sources.

6. The optical module according to claim 5, wherein the thermally conductive member has two inclined surfaces in the L-shaped structure.

7. A projection image display device having an optical module, a video signal processing circuit, a light source drive circuit, and a modulation element drive circuit, the optical module including a plurality of light source mounting parts, the light source mounting parts each including a light source, a circuit board on which the light source is mounted, and a reinforcement plate attached to the circuit board to reinforce the circuit board, the light source mounting parts being attached to a lateral surface of a housing containing optical parts, the optical module combining light from a plurality of light sources and irradiating a desired region with the combined light, the video signal processing circuit generating an image signal from an image signal input from the outside, the light source drive circuit supplying a drive current to the light sources, and the modulation element drive circuit controlling a modulation element, the projection image display device comprising:
a protrusion that is formed on the outer circumference of the lateral surface of the housing to which the light source mounting parts are attached; and
a thermally conductive member that includes a first surface and a second surface, the first surface being thermally conductively connected to a surface different from a surface of the reinforcement plate that is attached to the circuit board, the second surface being thermally conductively connected to the protrusion;
wherein the thermally conductive member has an inclined surface on the back side of the first surface, the inclined surface being formed along the first surface in such a manner that the thickness between the first surface and the inclined surface increases with a decrease in the distance to the second surface.

8. The projection image display device according to claim 7, wherein both sides of the inclined surface formed for the thermally conductive member are provided with a surface for disposing a mounting member.

9. The projection image display device according to claim 8, wherein the surface for disposing the mounting member on both sides of the inclined surface formed for the thermally conductive member is inclined with respect to the protrusion.

10. The projection image display device according to claim 7, wherein the inclined surface formed for the thermally conductive member is disposed at the center of the light sources and shifted from the center of the thermally conductive member.

* * * * *